US005278354A

United States Patent [19]

Lhomme

[11] Patent Number: 5,278,354

[45] Date of Patent: Jan. 11, 1994

[54] ELECTRICAL CONNECTION

[75] Inventor: Gerard Lhomme, Courdimanche, France

[73] Assignee: Raychem SA, France

[21] Appl. No.: 916,859

[22] PCT Filed: Feb. 6, 1991

[86] PCT No.: PCT/GB91/00175

§ 371 Date: Aug. 6, 1992

§ 102(e) Date: Aug. 6, 1992

[87] PCT Pub. No.: WO91/12638

PCT Pub. Date: Aug. 22, 1991

[30] Foreign Application Priority Data

Feb. 6, 1990 [GB] United Kingdom ................ 9002629

[51] Int. Cl.[5] ........................................ H02G 15/115

[52] U.S. Cl. .................................. 174/84 R; 29/859; 29/861; 29/871; 174/84 C; 174/84 S; 174/DIG. 8; 403/273; 439/750; 439/932

[58] Field of Search .......... 174/84R, 84C, 84S, 88S, DIG.8; 439/750, 932; 403/273; 29/859, 861, 871

[56] References Cited

U.S. PATENT DOCUMENTS

| | | | |
|---|---|---|---|
| 2,288,918 | 7/1942 | Parker | 439/750 X |
| 3,157,449 | 11/1964 | Hennessey | 439/932 X |
| 3,193,792 | 7/1965 | Shea, Jr. | 439/932 X |
| 3,455,022 | 7/1969 | Schmitz, Jr. | 29/859 |
| 3,538,240 | 11/1970 | Sherlock | 174/88 |
| 4,479,031 | 10/1984 | Ishise et al. | 174/DIG. 8 X |
| 4,883,925 | 11/1989 | Graf | 174/84 |

FOREIGN PATENT DOCUMENTS

| | | | |
|---|---|---|---|
| 0270283 | 6/1988 | European Pat. Off. . | |
| 0351982 | 1/1990 | European Pat. Off. . | |
| 2837396 | 3/1980 | Fed. Rep. of Germany | 174/DIG. 8 |
| 217347 | 6/1924 | United Kingdom | 174/845 |
| 1299825 | 12/1972 | United Kingdom . | |
| 2202393 | 8/1988 | United Kingdom . | |

*Primary Examiner*—Morris H. Nimmo

*Attorney, Agent, or Firm*—Herbert G. Burkard; Shri M. Novack

[57] ABSTRACT

An assembly for forming a semi-permanent electrical connection between a pair of wires (1,2) comprises a male push-fit connector (3) and a female push-fit connector (4).

Each connector (3,4) has a connection part to enable it to be connected to the wire, e.g. in the form of a crimp (5,6) and a mating part for engagement to the other connector. Each of the connectors has a sealing jacket (8,10) for sealing the connection to the associated wire, and one of the connectors has a heat-recoverable skirt (11) which, when the connectors are engaged, extends over part of the sealing jacket of the other connector to seal the connection against moisture ingress. The skirt (11) is provided with a layer of adhesive for forming the seal.

10 Claims, 1 Drawing Sheet

ELECTRICAL CONNECTION

Figures 1, 2:
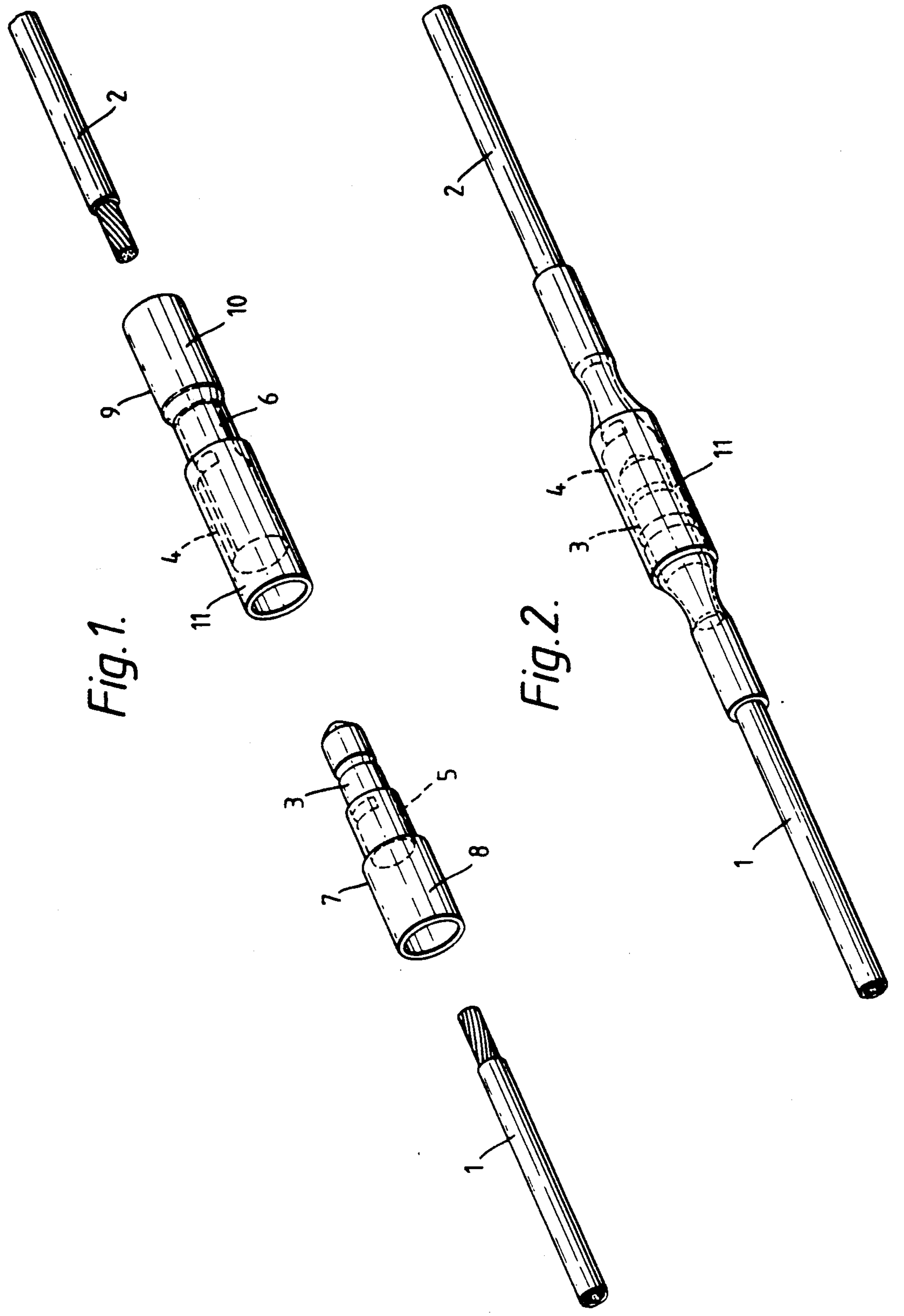

This invention relates to the connection of electrical wires.

A number of devices exist for the connection of electrical wires, for example, the wires may be connected by means of a crimp and the crimped connection may be sealed from the environment by means of a plastics sleeve, e.g. a dimensionally heat recoverable sleeve. In other applications different forms of device may instead be employed. For example, the wires may be connected by a solder containing connection device comprising dimensionally heat-recoverable sleeve that contains a quantity of solder so that an insulated and sealed solder joint may be formed in a simple manner by positioning the sleeve over the wires and heating the device to recover the sleeve and fuse the solder. Such devices are sold commercially by Raychem Corporation of California USA under the trademark "Solder Sleeve".

However, in some applications none of the existing products are satisfactory, for example when it is desired to form a semi-permanent connection that is sealed from the environment but which can be disonnected and reconnected a number of times.

According to one aspect, the present invention provides an electrical connection between a pair of electrical wires, which comprises a pair of associated connectors each of which has a connection part that is connected to a wire, and a mating part that is engaged with the other of the pair of connectors, each connector having a sealing jacket for sealing the connection between its connection part and a wire connected thereto, and one of the connectors having a heat-recoverable skirt, which extends over at least part of the sealing jacket of the other connector, the skirt having a layer of adhesive on its internal surface and having been recovered about the sealing jacket of the other connector so that the engaged connectors are sealed against moisture ingress by the sealing jackets and the skirt.

According to another aspect the invention a method of forming an electrical connection between a pair of wires which comprises:

(a) connecting one of a pair of associated connectors to each of the wires, each connector having a connection part to enable it to be connected to the wire and a mating part for engagement with the other of the pair of connectors and each connector having a sealing jacket for sealing the connection between its connection part and the wire connected thereto, and one of the connectors having a heat-recoverable skirt that has a layer of adhesive on its internal surface;

(b) engaging the pair of connectors so that the heat-recoverable skirt extends over at least part of the sealing jacket of the other connector; and (c) recovering the skirt about the sealing jacket to seal the engaged connectors against moisture ingress.

In the broadest aspect of the invention any adhesive may be employed with the heat-recoverable skirt although it should be a non-curable adhesive and preferably one whose adhesive strength decreases on heating. The adhesive is most preferably a hot-melt adhesive. Such an arrangement of connectors enables a semi-permanent electrical connection to be formed between a pair of wires which is sealed from the environment but which can be disconnected and reformed once or preferably more than once. In the connected state the skirt extends over, and is recovered onto, part of the sealing jacket of the other connector thereby sealing the connection from the environment. If, however, it is necessary to disconnect the connectors, the region of the skirt that overlaps the sealing jacket of the other connector is heated to soften it and to soften or fuse the adhesive, and the connectors may then simply be pulled apart. The connection may be reformed in a similar manner simply by heating the skirt again to soften it and to soften the adhesive, and pushing the connectors into engagement again, the softened or fused adhesive acting as a lubricant to facilitate sliding of the skirt over the sealing jacket of the other connector. Normally sufficient adhesive will remain in the overlapping region to provide an adequate seal against moisture ingress after several reconnections of the arrangement. If necessary the skirt may be heated again briefly to ensure complete recovery around the other connector.

Normally the electrical connectors will be engaged by push-fitting and will usually comprise a push-fit male/female pair. In this case the heat-recoverable skirt is preferably located over the female connector so that the larger lateral dimensions of the female connector prevent the skirt recovering by too large a degree after disconnection and thereby making subsequent reconnection difficult. The electrical connectors may be connected to the wires by any appropriate means, for example by means of a solder connection, although preferably they are connected by means of a crimp connection. In most instances the connectors will be round connectors although the invention is also applicable to connectors having different configurations such as flat contacts or rectangular contacts.

The sealing jackets may be, and preferably are, formed from dimensionally heat-recoverable sleeves. These sleeves may be located over the connectors and wire after they have been joined together or they may be located on the connector beforehand and then recovered during or after formation of the connection. In the preferred embodiment of the invention the sealing jacket comprises a length of heat-recoverable tubing, preferably one that has a layer of adhesive on its internal surface, which has been partially recovered onto the connection part of the connectors. In this case the wire is inserted into the connection part which, as stated above, is preferably in the form of a crimp, and the connection part is crimped onto the wire. The heat recoverable tubing may be recovered immediately onto the wire or this may be left until the connector is engaged with another connector and the heat-recoverable skirt is recovered.

In most cases the heat-recoverable skirt will be connected to one of the connectors, and in the preferred form of device the skirt and the sealing jacket of one of the connectors will be formed from the same piece of heat-recoverable tubing which has been partially recovered about the connector at a central section thereof. However, it is possible for the skirt to be formed as a separate sleeve to be positioned over a connector immediately before connection thereof and recovered onto engaged connectors so that each end of the sleeve overlies part of a sealing jacket.

The heat recoverable skirt and/or the sealing jackets may be formed from any material that is normally used for forming heat-recoverable sleeves, for example, from low, medium or high density polyethylene, ethylene copolymers for example with oxolefins such as 1-butene or 1-hexene or with vinyl acetate or ethyl acrylate, polyamides e.g. nylon 6, nylon 66, nylon 11, or nylon 12, or fluoropolymers e.g. polyvinylidine fluoride or ethylene/tetrafluoroethylene copolymer. In the case of sleeves that are to be positioned over a crimp, the sleeve is preferably formed from a nylon e.g. nylon 12.

The hot-melt adhesive preferably comprises an olefin adhesive, e.g. one based on polyethylene or an ethylene copolymer, e.g. with vinyl acetate, or a polyamide, e.g. one based on dimer diamines. Examples of such adhesive are given in U.S. Pat. Nos. 4,018,733 to lopez et al and 4,181,775 to Corke, the disclosures of which are incorporated herein by reference.

One form of connector and arrangement according to the invention will now be described by way of example with reference to the accompanying drawings, in which:

FIG. 1 is a view of an assembly employed in the connection according to the invention together with a pair of electrical wires before assembly; and FIG. 2 shows the assembly and wires of FIG. 1 after assembly and connection.

Referring to the accompanying drawings, an assembly for forming a semi-permanent electrical connection between a pair of insulated electrical wires 1 and 2 comprises a male push-fit connector 3 and a female push-fit connector 4. Both connectors have crimp portions 5 and 6 for enabling the connectors to be crimped onto a wire.

The male connector 3 has a heat-recoverable nylon sleeve 7 partially recovered onto its crimp portion 5 so that the unrecovered portion 8 of the sleeve extends beyond the end of the crimp portion 5 of the connector. The female connector 4 also has a heat-recoverable nylon sleeve 9 partially recovered thereon. In this case, however, the sleeve 9 is longer than the sleeve 7 of the male connector 3 and has two unrecovered portions, one unrecovered portion 10 extending beyond the end of the crimp portion 6 and another unrecovered portion 11 forming a skirt that extends over and beyond the end of push-fit part of the connector. Both recoverable sleeves 7 and 9 are provided with an internal layer (not shown) of hot-melt adhesive.

The connectors 3 and 4 are installed on the wires 1 and 2 by inserting the ends of the wires into the crimp barrels of the parts 5 and 6 of the connectors and crimping the connectors onto the wires. The recovereable parts 8 and 10 of sleeves 7 and 9 may then be heated, for example by means of a hot-air gun, infrared lamp or catalytic heater, in order to recover them about the wires and to melt the adhesive lining, thereby forming a moisture impermeable seal between the connectors and the wires.

An electrical connection between the terminated wires can then be formed simply by pushing the connectors into engagement and heating the skirt 11 to cause it to recover over the end of the sleeve 7 and thereby form a moisture impermeable seal.

The connection so formed may be broken simply by heating the portion of the skirt 11 overlying the sleeve 7 and pulling the connectors apart, the fused hot-melt adhesive lining of the skirt facilitating disconnection of the connectors 3 and 4. The connectors may subsequently be rejoined (or joined to different connectors of the same type) by reheating the skirt 11 and pushing the connectors into engagement, the fused or softened hot-melt adhesive lining of the skirt aiding the sliding of the skirt over the sleeve 7. This procedure may be repeated a number of times if desired, residual adhesive on the skirt and/or the outer surface of the sealing jacket enabling the reconnected assembly to be sealed from moisture ingress.

I claim:

1. An electrical connection between a pair of electrical wires, which comprises a pair of associated connectors each of which has a mating part and a connection part that is connected to a wire, the mating part of each connector being engaged with each other, each connector having a sealing jacket for sealing the connection between its connection part and the wire connected thereto, and one of the connectors having a heat-recoverable skirt, which extends over at least part of the sealing jacket of the one connector, the skirt having a layer of adhesive on its internal surface and having been recovered about the sealing jacket of the other connector so that the engaged connectors are sealed against moisture ingress by the sealing jackets and the skirt.

2. A connection as claimed in claim 1, wherein the skirt extends beyond the end of its connector.

3. A connection as claimed in claim 1, wherein the adhesive is a hot-melt adhesive.

4. A connection as claimed in claim 1, wherein the pair of associated connectors comprise push-fit connectors, one being a male connector and one being a female connector.

5. A connection as claimed in claim 3, wherein the skirt is located on the female connector.

6. A connection as claimed in claim 1, wherein the connection part of each connector comprises a crimp portion.

7. A connection as claimed in claim 1, wherein the sealing jackets are heat-recoverable and have been recovered about the connection parts and the wires connected thereto to form a seal.

8. A connection as claimed in claim 1, wherein the heat-recoverable skirt has been formed from a polyamide material.

9. A connection as claimed in claim 1, wherein the adhesive is a polyamide adhesive.

10. A method of forming an electrical connection between a pair of wires which comprises:

(a) connecting one of a pair of associated connectors having a connection part to each wire of a pair of wires, each connector having a sealing jacket for sealing the connection between its connection part and the wire connected thereto, and one of the connectors having a heat-recoverable skirt that has a layer of adhesive on its internal surface;

(b) engaging the pair of connectors so that the head-recoverable skirt extends over at least part of the sealing jacket of the other connector; and (c) recovering the skirt about the sealing jacket to seal the engaged connectors against moisture ingress.

* * * * *